United States Patent [19]

Popper et al.

[11] 3,955,661

[45] May 11, 1976

[54] APPARATUS FOR OPENING AND CLOSING DOOR MEMBERS AND THE LIKE

[75] Inventors: Jakhim B. Popper, Kiryat Motzkin, Israel; Riza E. Murteza, Oklahoma City, Okla.

[73] Assignee: LSB Industries, Inc., Oklahoma City, Okla.

[22] Filed: May 2, 1974

[21] Appl. No.: 466,280

Related U.S. Application Data

[63] Continuation-in-part of Ser. No. 267,182, June 28, 1972.

[52] U.S. Cl. ................................ 192/150; 74/798; 192/143; 49/26; 49/28; 160/188
[51] Int. Cl.² .................. F16D 11/04; F16H 13/06; E05F 15/02; E05F 15/00
[58] Field of Search ............ 74/796, 798, 845, 848; 192/143, 150; 49/26, 28; 160/188, 310, 311

[56] References Cited
UNITED STATES PATENTS

| | | | |
|---|---|---|---|
| 1,686,446 | 10/1928 | Gilman | 74/796 |
| 2,944,810 | 7/1960 | Stuettig et al. | 49/28 |
| 3,682,283 | 8/1972 | Sato | 192/150 X |
| 3,719,005 | 3/1973 | Carli | 49/28 |

FOREIGN PATENTS OR APPLICATIONS

| | | | |
|---|---|---|---|
| 1,236,760 | 12/1969 | United Kingdom | 49/28 |
| 1,202,104 | 10/1967 | United Kingdom | 74/796 |
| 446,140 | 3/1923 | Germany | 74/796 |
| 271,668 | 6/1927 | United Kingdom | 74/798 |
| 238,226 | 2/1926 | United Kingdom | 74/796 |

Primary Examiner—Samuel Scott
Assistant Examiner—P. S. Lall
Attorney, Agent, or Firm—Dunlap, Codding & McCarthy

[57] ABSTRACT

An improved apparatus for opening and closing door members and the like such as elevator doors and garage doors, for example, wherein the driver rotatingly drives a driver shaft coupled to a driven shaft via a ball drive assembly, the ball drive assembly not only coupling the driver and the driven shafts so the driven shaft is rotated at a reduced rate of speed, but also cooperating to provide a portion of a torque control for sensing obstructions in the door member path of travel and automatically stopping or reversing the opening or the closing of the door member. The ball drive assembly has a relatively low moment of inertia, which facilitates faster stopping of the door member travel, and the internal friction of the ball drive assembly is greater than a pulley-belt type of coupling, for example, thereby increasing the amount of force required to move the door member from a stopped position.

10 Claims, 10 Drawing Figures

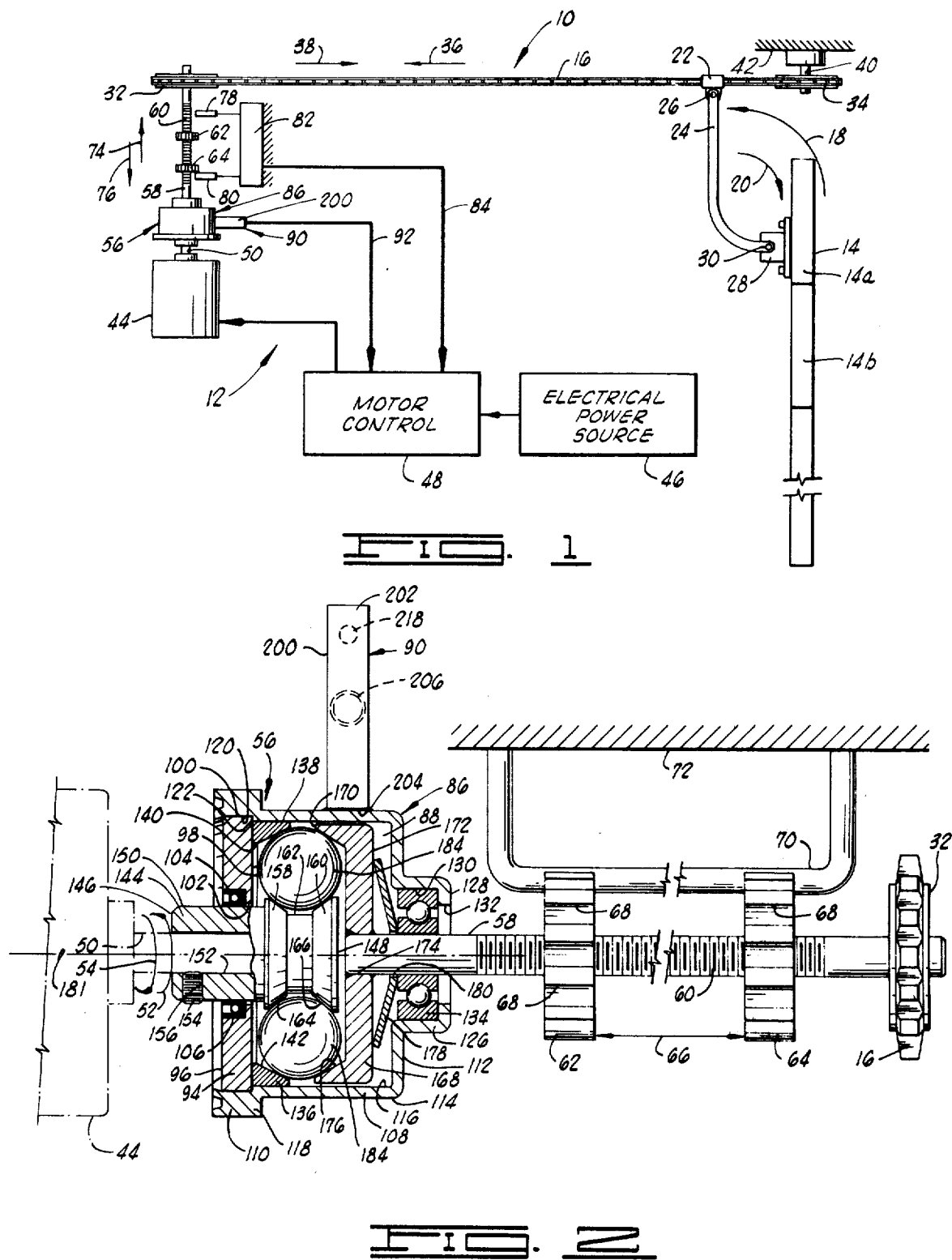

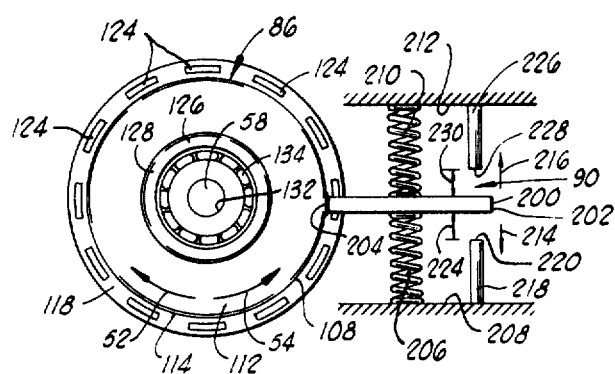
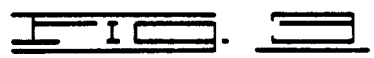
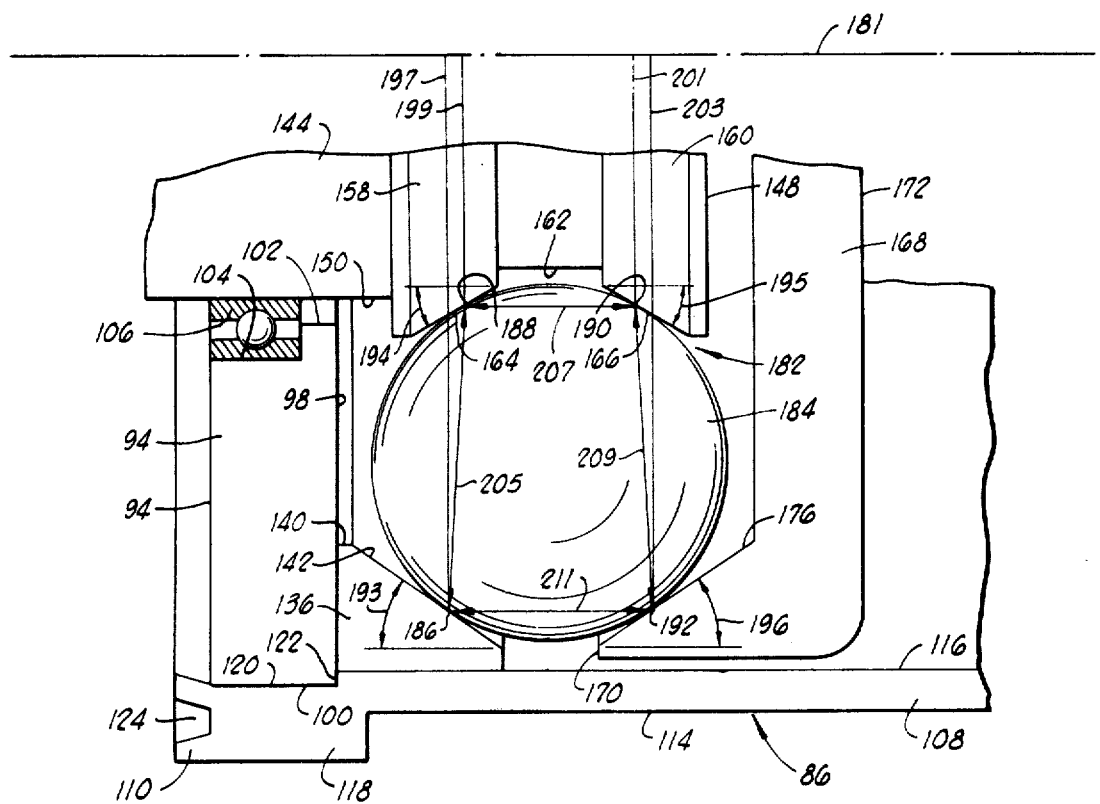
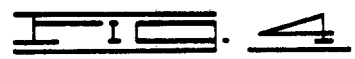

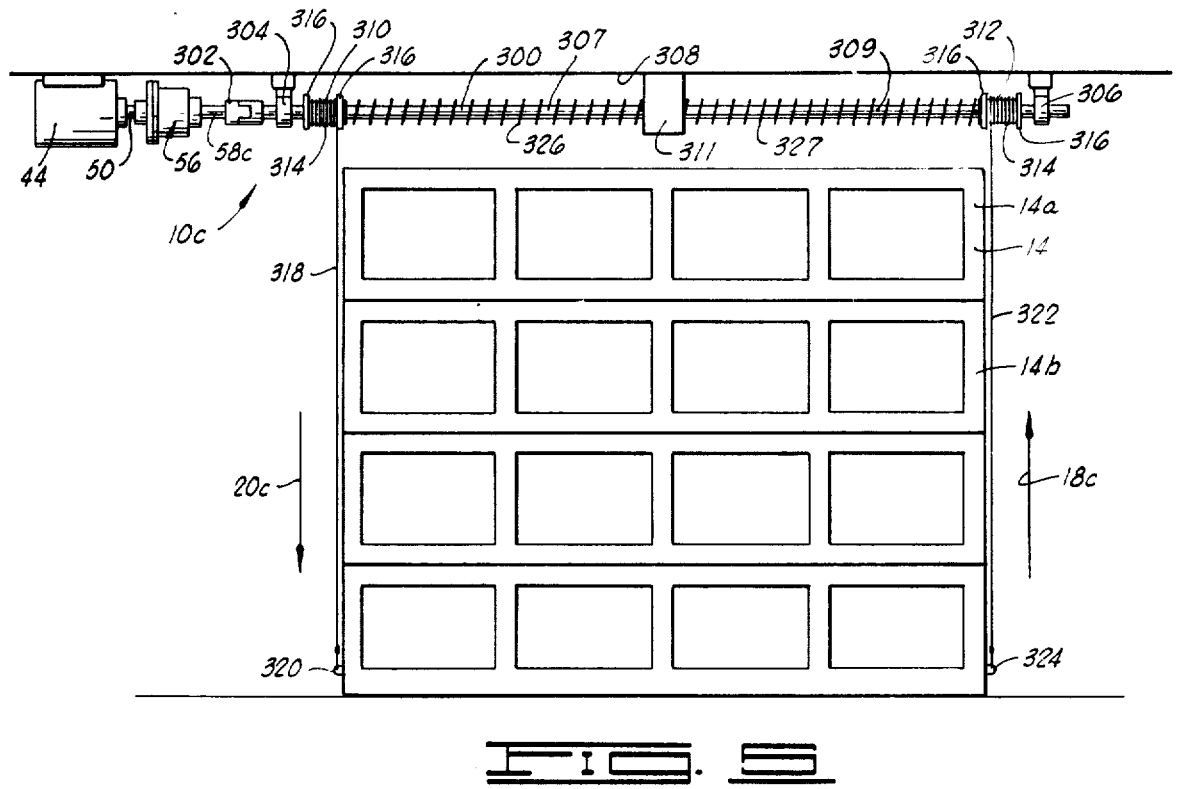
FIG. 5
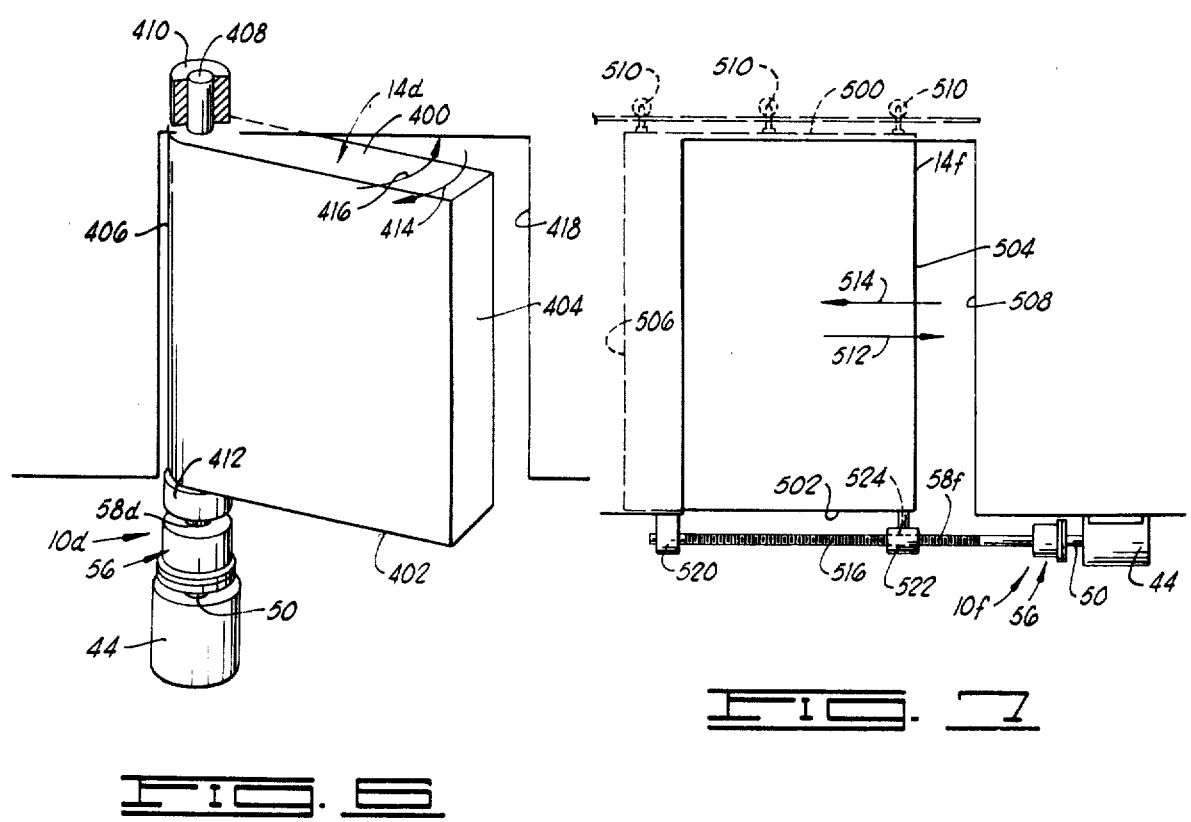
FIG. 6
FIG. 7

APPARATUS FOR OPENING AND CLOSING DOOR MEMBERS AND THE LIKE

CROSS-REFERENCE TO RELATED APPLICATIONS

The present invention is a continuation-in-part of the copending application Ser. No. 267,182, entitled "BALL BEARING SPEED TRANSMISSION DEVICE", filed June 28, 1972, and assigned to the assignee of the present invention.

BACKGROUND OF THE INVENTION

This invention relates generally to apparatus for opening and closing door members and the like and, more particularly, but not by way of limitation, to an improved door member drive and control assembly for cooperation in apparatus for opening and closing door members and the like.

SUMMARY OF THE INVENTION

An object of the invention is to provide an apparatus for opening and closing door members and the like which is more sensitive to obstructions in the door member path of travel.

Another object of the invention is to provide an improved door member drive and control assembly for utilization and connection with apparatus for opening and closing door members and the like which is more economical and safer, in the construction and the operation thereof.

A still further object of the invention is to provide an improved apparatus for opening and closing door members and the like wherein the door member can be secured in a stationary raised or lowered position or the stationary intermediate position generally between the opened and the closed position in a manner requiring a substantially increased force applied to the door member for moving the door member.

Yet another object of the invention is to provide an improved apparatus for opening and closing door members and the like wherein the driver is connected to the door member via an improved concentric ball drive assembly having a rotatingly suspended housing which is rotated against a torque control spring for sensing load torques.

One other object of the invention is to provide an improved apparatus for opening and closing door members and the like which is compact in construction and eliminates the necessity of including some of the gears, belts, additional bearings and the like previously required to connect the driver to the door member thereby providing door member drive and control assembly which is economical and rugged, and requires relatively little maintenance.

One other object of the invention is to provide an improved door member drive and control assembly for utilization in connection with apparatus for opening and closing door members and the like wherein the output speed of the driver is reduced for drivingly opening and closing the door member in a more efficient and more economical manner.

Another object of the invention is to provide an improved apparatus for opening and closing door members and the like which is more economical in the construction and the operation thereof, the apparatus of the present invention also including an improved control assembly which is more economical in construction and safer in operation.

BRIEF DESCRIPTION OF THE DRAWINGS

FIG. 1 is a diagrammatic, schematic view of an apparatus for opening and closing door members and the like including a door member drive and control assembly.

FIG. 2 is an enlarged, partial sectional, partial elevational view showing a portion of the door member drive and control assembly constructed in accordance with the present invention.

FIG. 3 is a front elevational view of the ball drive assembly portion of the door member drive and control assembly of FIG. 2.

FIG. 4 is an enlarged, fragmentary view showing a portion of the ball drive assembly of the door member drive and control assembly.

FIG. 5 is an elevational, partially diagrammatic view showing a modified apparatus for opening and closing door members and the like.

FIG. 6 is an elevational, partially diagrammatic view showing another modified apparatus for opening and closing door members and the like.

FIG. 7 is an enlarged, partially diagrammatic view showing yet another modified apparatus for opening and closing door members and the like.

BRIEF DESCRIPTION OF THE PREFERRED EMBODIMENTS

Figure 8:
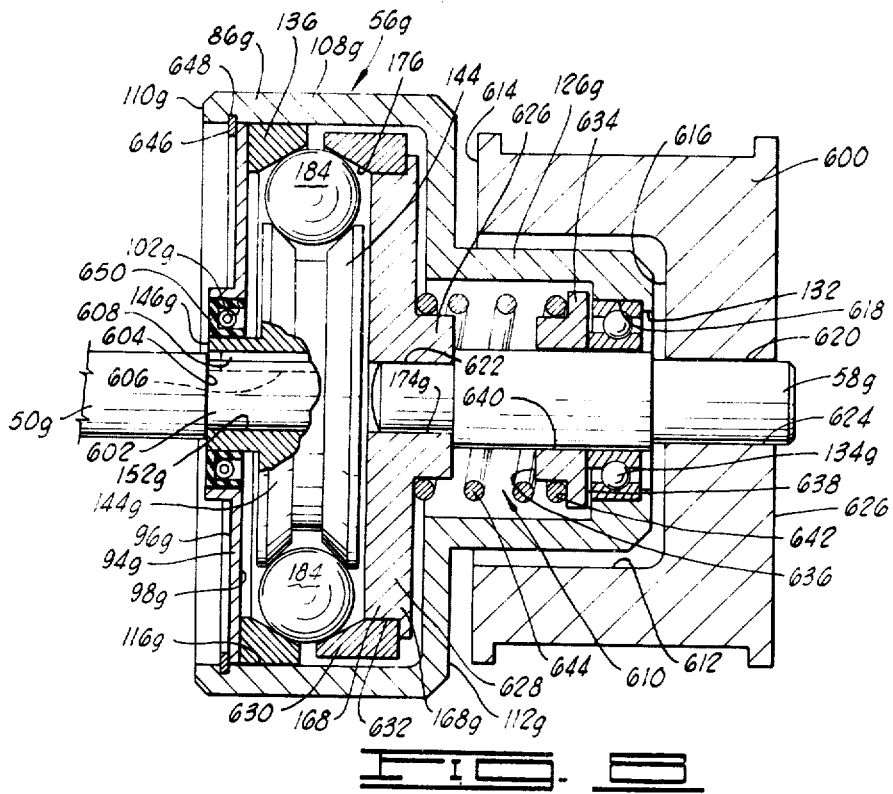
FIG. 8 is a sectional view of a modified ball drive assembly.

Referring to the drawings in general, and to FIG. 1 in particular, shown therein and designated via the general reference numeral 10 is an apparatus for opening and closing door members, such as garage doors, for example, the apparatus 10 being constructed in accordance with the present invention and including a door member drive and control assembly 12. The door member drive and control assembly 12 is connected to a door member 14 via a drive chain 16, the door member 14 being raised in a general direction 18 in one actuated position of the door member drive and control assembly 12 and lowered in a general direction 20 in one other position of the door member drive and control assembly 12. In one particular aspect of the present invention, the door member drive and control assembly 12 is particularly constructed such that the opening and closing of the door member 14 is reversed or stopped when an obstruction is sensed in the door member 14 path of travel in a manner which will be described in greater detail below.

The path of travel of the door member 14 as the door member 14 is opened or closed in the general directions 18 and 20, respectively, is defined via a pair of rails (not shown), one rail being disposed generally on each side of the door member 14. In one operational application, the door member 14 is connected to the rails via a plurality of wheels (not shown), some of the wheels being connected to one side of the door member 14 and rollingly and guidingly disposed in one of the guide rails and the remaining wheels being connected to the opposite side of the door 14 and retainingly and guidingly disposed within a portion of the other guide rail. In this form, the door member 14 is divided horizontally into segments and each segment is hingedly connected to the adjacent segment (two of the segments being designated in FIG. 1 via the reference numerals 14a and 14b for the purpose of clarity of description). It should be particularly noted that the apparatus of the present invention can also be utilized for opening and closing door members which are of a unitary or single piece construction, the door member 14 being shown in the drawings as divided into segments only for the purpose of illustration.

As the door member 14 is raised in the general direction 18, the door member 14 is retained in the predetermined path of travel via the engagement between the door member 14 wheels and the guide rails, the door member 14 being initially raised in a generally vertical direction to a predetermined height and subsequently moved a predetermined distance along a path extending at an angle of approximately 90° with respect to the vertical, opening or raising direction. In the closing or lowering position of the door member drive and control assembly 12, the door member 14 is initially moved along the door mbmer path of travel in a direction extending generally at 90° to a vertically extending direction and subsequently lowered in a vertically downwardly direction. The movement of the door member 14 in the raising direction 18 and in the lowering direction 20 (sometimes referred to herein as the opening direction 18 and the closing direction 20) is facilitated via the segmental construction of the door member 14, i.e. the segments 14a and 14b, for example. Apparatus for opening and closing door members, such as garage doors, for example, wherein the door member is constructed of horizontally divided segments to facilitate the opening or raising of the door member in a generally vertical direction and subsequently moving the door member in a direction at an angle generally 90° with respect to the vertical moving direction are generally well-known in the art and commercially available.

As shown in FIG. 1, a carriage 22 is secured to a portion of the drive chain 16 and one end of an arm 24 is pivotally secured to the carriage 22 via a pivot connection 26. The end of the arm 24, opposite the pivot connection 26 end thereof, is pivotally secured to the door member 14 via a door bracket 28, the arm 24 being pivotally secured to the door bracket 28 via a pivot connection 30.

The apparatus 10 includes a drive sprocket 32 and an idler sprocket 34, the drive sprocket 32 and the idler sprocket 34 being spaced a predetermined distance apart and disposed generally in the same horizontal plane. The drive chain 16 is drivingly connected to portions of the drive sprocket 32 and the idler sprocket 34 and the drive chain 16 is driven in the opening direction 36 and the closing direction 38 in a rotatingly driven position of the drive sprocket 32.

As shown in FIG. 1, the idler sprocket 34 is journally supported on a shaft 40 secured to a support surface 42, such as the roof structure of a garage or a support connected to and extending from the roof structure of the garage, in a manner generally well-known in the garage door opener art, for example.

In one operational embodiment, the door member drive and control assembly 12 is also supported near the roof of a garage or other such support structure in a manner well-known in the garage door opener art, for example, the door member drive and control assembly 12 being constructed to drivingly rotate and move the drive chain 16 in the closing direction 38, in one other actuated position of the door member drive and control assembly 12.

The door member drive and control assembly 12 includes a drive 44, such as an electric motor or the like for example, connected to an electrical power source 46 via a motor control 48, the motor control 48 being constructed to establish electrical continuity between the driver 44 and the electrical power source 46 in an "on" position thereof and to interrupt the electrical continuity between the electrical power source 46 and the driver 44 in an actuated "off" position thereof. The driver 44 has a driver shaft 50, and the driver 44 is constructed and connected to the driver shaft 50 to rotatingly drive the driver shaft 50 in an opening direction of rotation 52 in one actuated on position of the motor control 48 and to rotatingly drive the driver shaft 50 in a reverse or closing direction of rotation 54 in one other actuated on position of the motor control 48. Electric motors and motor controls constructed for driving the motor output shaft in two directions of rotation in predetermined actuated positions of the motor control are well-known in the art and commercially available.

The driver shaft 50 is connected to one end of a ball drive assembly 56 and one end of a driven shaft 58 is connected to the opposite end of the ball drive assembly 56. The end of the drive shaft 58, opposite the end connected to the ball drive assembly 56, is secured to the drive sprocket 32, the driver 44 being connected to the drive sprocket 32 via the ball drive assembly 56 interposed between the driver shaft 50 and the driven shaft 58. The driver 40 thus rotates the drive sprocket 32 moving the drive chain 16 in the opening direction of rotation 36 in the actuated on position of the motor control 48 and drivingly rotates the drive sprocket 32 moving the drive chain 16 in the closing direction of rotation 38 in the one other actuated on position of the motor control 48.

As shown in FIGS. 1 and 2, the driven shaft 58 includes a threaded portion 60 extending a predetermined distance along a portion of the length of the driven shaft 58 generally between the drive sprocket 32 and the ball drive assembly 56, and a pair of travel nuts are threadedly secured to the threaded portion 60 of the driven shaft 58. More particularly, a first travel nut 62 and a second travel nut 64 are each threadedly secured to the threaded portion 60 of the driven shaft 58, the first travel nut 62 being spaced a distance 66 from the second travel nut 64, as shown in FIG. 2.

The first and the second travel nuts 62 and 64 each have a plurality of spaced recesses 68 formed in the outer peripheral surfaces thereof, two of the recesses 68 of each of the travel nuts 62 and 64 being designated via reference numerals in FIG. 2 for the purpose of clarity. The recesses 68 formed in the first and the second travel nuts 62 and 64 are each sized to receive a portion of a stop arm 70, the stop arm 70 being generally U-shaped and pivotally connected to a support surface 72 (the support surface 72 being diagrammatically shown in FIG. 2). In an operating position, the first and the second travel nuts 62 and 64 are each threadedly moved to predetermined positions on the threaded portion 60 of the driven shaft 58 and the stop arm 70 is then moved to a position wherein a portion of the stop arm 70 is disposed in one of the recesses 68 of the first travel nut 62 and another portion of the stop arm 70 is disposed in one of the recesses 68 of the second travel nut 64, the recesses 68 and the portions of the stop arm 70 disposed therein being each shaped such that the travel nuts 62 and 64 are each movable axially along the driven shaft 58 in a second direction 76 as the driven shaft 58 is rotated in the direction moving the drive chain 16 in the closing direction of rotation 38, for reasons which will be made more apparent below.

As shown more clearly in FIG. 1, the travel nuts 62 and 64 are each disposed generally between a pair of limit switches or, more particularly, between an opened limit switch 78 and a closed limit switch 80. Each of the limit switches 78 and 80 are connected to a limit switch control 82 and the limit switch control 82 is connected to the motor control 48 via a signal path 84.

In an assembled position of the door member drive and control assembly 12, the travel nuts 62 and 64 are positioned on the threaded portion 60 of the driven shaft 58, and the travel nuts 62 and 64 are each disposed generally between the limit switches 78 and 80. As shown in FIG. 1, a portion of the second travel nut 64 is positioned generally adjacent and engaging a portion of the closed limit switch 80 and, in this position of the door member drive and control assembly 12, the door member 14 is positioned in the lowered or closed position. The engagement between the second travel nut 64 and the closed limit switch 80 actuates a signal via the limit switch control 82, the signal being connected to the motor control 48 via the signal path 84. The motor control 48 is positioned in the off position upon receipt of this signal via the signal path 84 thereby disconnecting the driver 44 from the electrical power source 46 and positioning the door member drive and control assembly 12 in the off position.

When it is desired to raise the door member 14 toward an opened position, the motor control 48 is positioned in the on position connecting the driver 44 to the electrical power source 46, the driver 44 thereby drivingly rotating the driver shaft 50 and the driven shaft 58 in the opening direction of rotation 52. When the driven shaft 58 is rotated in an opening direction 52, the drive chain 16 is driven in the general direction 36 pulling the door member 14 in a vertically upwardly direction and back along the door member 14 path of travel to an opened position, in a manner generally described before. Since portions of the stop arm 70 are disposed in the recesses 68 of the travel nuts 62 and 64, the travel nuts 62 and 64 are each retained in a stationary position as the driven shaft 58 is rotated and thus both of the travel nuts 62 and 64 are moved in a generally forward direction 74 toward the opened limit switch 78. When the first travel nut 62 engages the raised limit switch 78, the limit switch control 82 is actuated and connects a signal via the signal path 84 to the motor control 48 positioning the motor control 48 in the off position thereby disconnecting the electrical power source 46 from the driver 44.

The initial positioning of the travel nuts 62 and 64 on the driven shaft 58, the initial positioning of the limit switches 78 and 80, and the threaded portion 60 of the driven shaft 58 each cooperate to provide an adjustable control for automatically positioning the driver 44 in the off position when the door member 14 has been raised or lowered to predetermined positions. Further, since the ball drive assembly 56 provides a direct connection between the drive shaft 50 and the driven shaft 58, the travel nuts 62 and 64 can be conveniently placed directly on the driven shaft 58 eliminating the necessity of additional mountings and connections normally required for incorporating such control features in a door member drive and control apparatus for opening and closing garage doors and the like.

As shown more clearly in FIGS. 2, 3 and 4, the ball drive assembly 56 includes a cylindrically shaped housing 86 having a hollow portion 88 formed therein, the end portion of the driver shaft 50, opposite the end connected to the driver 44, being bearingly disposed through one end of the housing 86 and the end of the driven shaft 58, opposite the end connected to the drive sprocket 32, being bearingly supported and disposed through the end of the housing 86, opposite the driver shaft 50 end thereof. A torque control 90 has a portion connected to a portion of the housing 86 and another portion connected to the motor control 48 via a signal path 92.

In general, the ball drive assembly 56 is constructed to provide a driving connection between the driver shaft 50 and the driven shaft 58 such that the driven shaft 58 is rotatingly driven at a predetermined reduced rate of speed as compared to the rotational speed of the driver shaft 50. The torque control 90 is constructed to sense an obstruction in the path of travel of the door member 14 and to connect a signal to the motor control 48 via the signal path 92 indicating a sensed obstruction, the motor control 48 being positioned in the off position and disconnecting the driver 44 from the electrical power source 46 when receiving the signal from the torque control 90 via the signal path 92, in one preferred embodiment. The door member drive and control assembly 12 is thus automatically positioned in the off position when an obstruction is sensed in the path of travel of the door member 14 as the door member 14 is moved in the opening direction 18 or in the closing direction 20.

In one other preferred embodiment, the motor control 48 is constructed to receive the signal via the signal path 92 indicating a sensed obstruction and connect the electrical power source 46 to the driver 44 in a manner positioning the driver 44 in the on position rotating the driver shaft 50 in the reverse or opposite direction of rotation as compared to the direction of rotation when the obstruction was sensed. Assuming the driver 44 is connected to the electrical power source 46 to rotatingly drive the driver shaft 50 in the opening direction of rotation 52, the motor control 48 connects the driver 44 to the electrical power source 46 to rotatingly drive the driver shaft 50 in the closing direction of rotation 54 in response to a signal received from the torque control 90 via the signal path 92. By the same token, if the driver 44 is connected to the electrical power source 46 to rotatingly drive the driver shaft 50 in the closing direction of rotation 54, the motor control 48 connects the driver 44 to the electrical power source 46 to rotatingly drive the driver shaft 50 in the opening direction of rotation 52 in response to a signal received from the torque control 90 via the signal path 92. The construction of the motor control 48 to reverse the direction of rotation of the driver 44 or to position the driver 44 in the off position in response to a signal received from the torque control 90 via the signal path 92 depends upon the design and safety considerations of a particular operational embodiment or application.

the housing 86 more particularly includes a circularly shaped end plate 94 having opposite end faces 96 and 98, and an outer periphery 100 and a shaft opening 102 formed through a central portion thereof. A counterbore 104 is formed through the end face 96 of the end plate 94 intersecting a portion of the shaft opening 102 and extending a distance axially through the end plate 94. A seal member 106 is disposed and retained in the counterbore 104, as shown more clearly in FIGS. 2 and 4.

The housing 86 also includes a generally cylindrically shaped body 108 having opposite ends 110 and 112, an outer periphery 114 and a bore 116 formed through the end 110 thereof and extending a distance axially therethrough generally toward the end 112 thereby forming what is sometimes referred to herein as the open end 110 and the closed end 112 of the body 108. A flange 118 is formed on the open end 110, the flange 118 extending a distance radially outwardly from the outer periphery 114 of the body 108.

A counterbore 120 is formed in the end 110 of the body 108 generally adjacent and intersecting the bore 116, the counterbore 120 extending a distance axially through the bore 116, terminating with an annular end wall 122. The end plate 94 is disposed in the counterbore 120 to a position wherein a portion of the end face 98, generally near the outer periphery 100, abuts the end wall 122. In this position, the body 108 is secured to the end plate 94 and the bore 116 cooperates with the end face 98 to form a portion of the hollow portion 88 of the housing 86.

One preferred form of fastening the body 108 to the end plate 94 is to crimp portions of the end 110 generally near the bore 116 thereby driving portions of the end 110 of the body 108 generally over adjacent portions of the end plate 94, as shown in FIGS. 3 and 4, and securing the end plate 94 in the counterbore 120. The crimped portions (designated in FIGS. 3 and 4 via the reference numeral 124, only some of the crimped portions 124 being designated in FIG. 3) of the body 108 are formed at an angle extending generally toward the bore 116 of the body 108 and, in one preferred form, a plurality of generally rectangularly shaped crimped portions 124 are formed and spaced circumferentially about the end 110 thereby locking the body 108 to the end plate 94 in a relatively fast and economical manner.

A projection 126 is formed on a central portion of the closed end 112 of the body 108, the projection 112 extending a distance axially outwardly from the closed end 112 terminating with an end wall 128. A bore 130 is formed in the projection 126, a portion of the bore 130 intersecting and communicating with the bore 116. A shaft opening 132 is formed through the end wall 128 of the projection 126, the shaft opening 132 intersecting and communicating with the bore 130 and the bore 116, as shown in FIG. 2. A bearing member 134 is disposed and retained in the bore 130, for reasons and in a manner which will be described in greater detail below.

An annular fixed member 136 is disposed in the hollow portion 88 of the housing 86, the fixed member 136 having an outer peripheral surface 138 and an inner peripheral surface 140, a portion being disposed generally adjacent and engaging the end face 98 of the end plate 94 thereby limiting the movement of the fixed member 136 in an axial direction generally toward the open end 110 of the body 108. The outer peripheral surface 138 of the fixed member 136 is disposed generally adjacent and engages a portion of the annular surface formed via the bore 116 through the body 108. The fixed member 136 is, in one form, ring-shaped and includes a bearing surface 142 formed on a portion of the annular inner peripheral surface 140 thereof, the bearing surface 142 extending at an angle with respect to the axis of rotation of the driver shaft 50 and the driven shaft 58, the orientation and angular disposition of the bearing surface 142 to be described in greater detail below.

A driving member 144 has a portion secured to the driver shaft 50 and another portion forming a pair of angularly oriented bearing surfaces disposed generally within the hollow portion 88 of the housing 86, the bearing surfaces being rotated during the rotation of the driver shaft 50, in a manner and for reasons to be described below. More particularly, the driving member 144 is cylindrically shaped having opposite ends 146 and 148, an outer peripheral surface 150 and a bore 152 formed through and intersecting the end 146 thereof, the bore 152 extending a distance axially through the driving member 144.

In an assembled position of the ball drive assembly 56, a portion of the end of the driver shaft 50, opposite the end connected to the driver 44, is disposed through the bore 152 of the driving member 144 and a set screw 154 is threadedly disposed through a threaded aperture 156, the aperture 156 extending generally transversely to the bore 152 intersecting the outer peripheral surface 150 and the bore 152. One end portion of the set screw 154 engages the adjacent portion of the driver shaft 50 securing the driving member 144 in a stationary position relative to the driver shaft 50, the driving member 144 being rotated in a rotated position of the driver shaft 50.

A pair of spaced, radially extending projections 158 and 160 are formed on the end 148 of the driving member 144, opposite the end 146 connected to the driver shaft 50, an annular recessed area 162 being formed on the driving member 144 generally between the projections 158 and 160. A first bearing surface 164 is formed on a portion of the outer peripheral surface of the projection 158, the bearing surface 164 generally facing the bearing surface 166 and the two bearing surfaces 164 and 166 being spaced a predetermined distance axially apart on the driving member 144, for the reasons and in a manner to be described in greater detail below.

The end 148 of the driving member 144 extends through the shaft opening 102 formed through the end plate 94 and the projections 158 and 160, including the first and second bearing surfaces 164 and 166 formed thereon, are disposed generally within the hollow portion 88 of the housing 86 or, in other words, generally within the bore 116 of the body 108, as shown in FIGS. 2 and 4. The driving member 144 is, more particularly, bearingly connected to the ball drive assembly 56 and, since the driving member 144 is secured to the driver shaft 50, the first and the second bearing surfaces 164 and 166 of the projections 158 and 160 are rotatingly disposed within the hollow portion 88 of the housing 86, the first and the second bearing surfaces 164 and 166 being drivingly rotated in a driven position of the driver shaft 50 during the operation of the apparatus 10.

A circularly shaped driven member 168, having opposite end faces 170 and 172 and an opening 174 formed through a central portion thereof intersecting the end faces 170 and 172, is connected to the end of the driven shaft 58, opposite the end of the driven shaft 58 connected to the drive sprocket 32. More particularly, the end of the driven shaft 58, opposite the drive sprocket 32 end thereof, is disposed through the opening 174 in the driven member 168 and the driven shaft 58 is secured to the driven member 168 such as by welding, for example.

An annularly shaped driven member bearing surface 176 is formed in a portion of the end face 170 of the driven member 168. In an assembled position as shown more clearly in FIG. 2, the end of the driven shaft 58, opposite the drive sprocket 32 end thereof, is disposed through the shaft opening 132 of the housing 86 and through the bearing member 134 to a position disposing the driven member 168 generally within a hollow portion 88 of the housing 86, the ball drive assembly 56 being thus bearingly connected to the driven shaft 58 via the bearing member 134 and the driven shaft 58 being rotatingly supported between the ball drive assembly 56 and the drive sprocket 32 for rotatingly driving the drive sprocket 32 in a driven position thereof.

A spring 178 is disposed in the hollow portion 88 of the housing 86, the spring 178 having an opening 180 formed through a central portion thereof and a portion of the driven shaft 58 is disposed through the opening 180 of the spring 178. A portion of the spring 178 engages the end face 172 of the driven member 168 and another portion of the spring 178 engages a portion of the bearing member 134, the spring 178 biasingly retaining the bearing member 134 in an assembled position disposed within the bore 130 portion of the housing 86 during the operation of the door member drive and control assembly 12.

The driver shaft 50 is supported for rotation about an axis of rotation aligned with and coincident with the axis of rotation of the driven shaft 58, the driver shaft 50 being bearingly supported via the driver 44 and the driven shaft 58 being bearingly supported via the bearing member 134. Further, the annular bearing surfaces 142, 164, 166 and 176 each extend about a common axis corresponding to the common axis of rotation of the driver shaft 50 and the driven shaft 58, the fixed member 136 bearing surface 142, the driving member 144 bearing surfaces 164 and 166 and the driven member 168 bearing surface 176 being coaxially supported with respect to the common axis of rotation 181 (shown in FIGS. 2 and 4) of the driver shaft 50 and the driven shaft 58.

The annular bearing surfaces 142, 164, 166 and 176 are oriented and disposed within the hollow portion 88 of the housing 86 to define an annular ball race 182 (shown in FIG. 4) having a centerline axis corresponding to the common axis of rotation of the driver shaft 50 and the driven shaft 58. A plurality of balls 184 are disposed and rollingly retained within the annular ball race 182. The annular bearing surfaces 142, 164, 166 and 176 are further oriented and disposed with respect to the balls 184 and the axis of rotation of the driver shaft 50 and the driven shaft 58 such that the fixed member 136 bearing surface 142 contacts the balls 184 at a contact point 186, the driving member 144 bearing surface 164 contacts the balls 184 at a contact point 188, the driving member 144 bearing surface 166 contacts the balls 184 at a contact point 190 and the driven member 168 bearing surface 176 contacts the balls 184 at a contact point 192, the contact points 186, 188, 190 and 192 define annular contact surfaces engaging the balls 184 during the operation of the ball drive assembly 56 and these are referred to herein as contact points merely for the purpose of clarity of description since there is essentially a point contact between the bearing surfaces and any one ball at any instant in time during the operation.

The relationship between the rotational speeds of the fixed member 136, the driving member 144 and the driven member 168 is generally expressed via the following algebraic equation:

$$n_x = n_z(i) + n_y(1-i) \qquad 1$$

wherein:

$n_x$ = the rotational speed of the driven member 168;
$n_y$ = the rotational speed of the fixed member 136;
$n_z$ = the rotational speed of the driving member 144; and
$i$ = the reduction ratio, i.e. the ratio of $_x(n/n)_z$ The fixed member 136 is secured to the ball drive assembly 56 housing 86 and does not rotate during the operation of the door member drive and control assembly 12 except during the operation of torque control 90. Assuming the fixed member 136 is stationary relative to the reference axis of rotation ($n_y = 0$), the algebraic expression (1) is expressed as follows:

$$n_x/n_z = i \qquad 2$$

By the same token, if the driven member 168 is stationary relative to the reference axis of rotation 181 ($n_x = 0$), the algebraic expression (1) is expressed as follows:

$$n_z/n_y = 1-i \qquad 3$$

When the absolute value of $i$ is greater than (1) [$|i|>1$], the driven shaft 58 rotates slower than the driver shaft 50. Also, when the value of $i$ is greater than 0 [$i>0$], the ratio of ($n_x/n_z$) will be greater than the value of the ratio of ($n_x/n_y$).

Assuming the driving member 144 remains or is held stationary, the relationship between the rotational speeds of the fixed member 136 and the driven member 168 is expressed as follows:

$$n_y/n_x = i/(i-1) \qquad 4$$

In general, and referring to the operation of the ball drive assembly 56 operating according to the algebraic expression (2), the quantity $i$ may vary between values of plus infinity and minus infinity. When the quantity of $i$ is greater than 0, the driven member 168 rotates in the same direction as the driving member 144. When the quantity of $i$ is less than 0, the driven member 168 rotates in the opposite direction as compared to the direction of rotation of the driving member 144. When the quantity of $i$ is equal to infinity, the driven member 168 does not rotate and the ball drive assembly 56 will operate as a ball bearing. When the absolute value of the quantity $i$ is greater than unity, the driven member 168 rotates at a slower speed than the driving member 144. When the absolute value of the quantity $i$ is less than unity, the driven member 168 rotates faster than the driving member 144. When the quantity $i$ is equal to 0, the driven member 168 will rotate at a relatively high speed but will not transmit any torque. When the absolute value of the quantity $i$ is unity, the driven member 168 rotates at the same speed as the driving member 144.

The efficiency of the ball drive assembly 56 is proportional to the ratio of the coefficients of sliding to rolling friction between the balls 184 and the bearing surfaces 142, 164, 166 and 176, this factor influencing the selection of materials and lubricants for utilization in the ball drive assembly 56. To enhance the rolling of the balls 184 along the bearing surfaces 142, 164, 166 and 176, sufficient normal force must exist between the bearing surfaces 142, 164, 166 and 176 and the balls 184, a condition achieved via the supporting of the driver shaft 50 and the driven shaft 58 and augmented via the spring 178 biasing the driven member 168 in an axial direction toward the balls 184.

The various relationships defining various constructions of devices such as the ball drive assembly 56 were disclosed in detail in the copending application entitled "BALL BEARING SPEED TRANSMISSION DEVICE", filed on June 28, 1972, Ser. No. 267,182, and assigned to the assignee of the present invention. Referring particularly to the ball drive assembly 56, the fixed member 136, the driving member 144 and the driven member 168, including the bearing surface 142, 164, 166 and 176 and the associated contact points 186, 188, 190 and 192, have each been particularly constructed to effect a predetermined speed reduction between the driver shaft 50 and the driven shaft 58, the following design parameters having been found to provide satisfactory, desired operating characteristics:

TABLE I

1. Driver 44 = A ⅓ horsepower, three phase, 115 volt, 60 cycle, electrical, reversible motor having an output shaft (driver shaft 50) rotational speed of 980 r.p.m., such as commercially available from such manufacturers as General Electric Corporation or Westinghouse Corporation, for example.
2. Driven shaft 58 rotational speed of approximately 89.0 r.p.m., and an output torque measured at the drive sprocket 32 of approximately 120 lb. in. and developing an available horsepower of approximately 0.17 at the drive sprocket 32.
3. A fixed member 136 bearing surface 142 disposed at an angle 193 of approximately 25° 45' with respect to the common axis of rotation 181 of the driver shaft 50 and the driven shaft 58, the angle 193 being illustrated in FIG. 4.
4. A driving member 144 bearing surface 164 disposed at an angle 194 of approximately 28° 31' with respect to the common axis of rotation 181 of the driver shaft 50 and the driven shaft 58, the angle 194 being illustrated in FIG. 4.
5. A driving member 144 bearing surface 166 disposed at an angle 195 of approximately 39° 16' with respect to the common axis of rotation 181 of the driver shaft 50 and the driven shaft 58, the angle 195 being illustrated in FIG. 4.
6. A driven member 168 bearing surface 176 disposed at an angle 196 of approximately 38° 12' with respect to the common axis of rotation 181 of the driver shaft 50 and the driven shaft 58, the angle 196 being illustrated in FIG. 4.
7. A fixed member 136 constructed of Bearing Quality Steel and having bearing surface 142 contact points 186 spaced a distance 197 of approximately 1.4375 inches on a radius measured from the common axis of rotation 181 of the driver shaft 50 and the driven shaft 57.
8. A driving member 144 constructed of Bearing Quality Steel and having bearing surface 164 contact points 188 spaced a distance 199 approximately 0.5625 inches radius measured from the common axis of rotation 181 of the driver shaft 50 and the driven shaft 58, the bearing surface 164 contact points 188 being spaced a distance 205 of approximately 0.850 inches from the bearing surface 142 contact points 186 of the fixed member 136.
9. A driving member 144 having bearing surface 166 contact points 190 spaced a distance 201 of approximately 0.6250 inches radius measured from the common axis of rotation 181 of the driver shaft 50 and the driven shaft 58, and bearing surface 166 contact points 190 spaced a distance 207 of approximately 0.500 inches from the bearing surface 164 contact points 188.
10. A driven member 168 constructed of Bearing Quality Steel and having bearing surface 176 contact points 192 spaced a distance 203 approximately 1.40 inches on a radius measured from the common axis of rotation 181 of the driver shaft 50 and the driven shaft 58, the bearing surface 176 contact points 192 being spaced a distance 209 of approximately 0.800 inches from the bearing surface 166 contact points 190 of the driving member 144 and spaced a distance 211 of approximately 0.600 inches from the bearing surface 142 contact points 186 of the fixed member 136.
11. In this particular operational embodiment, a particular lubricant found to provide satisfactory results is commercially available from Monsanto Chemical Company, sold under their trade name Santotrac grease, and designated via their reference EP2, for example. Since the ball drive assembly 56 develops essentially a metal-to-metal contact between the balls 184 and the bearing surfaces 142, 164, 166 and 176 to achieve a sufficient torque and horsepower output at the driven shaft 58, a relatively high level of heat can be generated during the operation and the particular lubricant should be so selected, the lubricant also having a relatively high coefficient of traction and corresponding pressure-viscosity characteristics.

The torque control 90 of the door member drive and control assembly 12, more particularly, includes a torque arm 200 having opposite ends 202 and 204, the end 204 of the torque arm 200 being secured to a portion of the outer peripheral surface of the housing 86 and the torque arm 200 extending a distance radially outwardly from the housing 86, as shown more clearly in FIGS. 2 and 3. A first torque control spring 206 is disposed between the torque arm 200 and a stationary support surface 208, one end of the first torque control spring 206 being secured to the torque arm 200 and the opposite end of the first torque control spring 206 being secured to the support surface 208. A second torque control spring 210 is disposed between the torque arm 200 and a stationary support surface 212, one end of the second torque control spring 210 being secured to the torque arm 200 and the opposite end of the second torque control spring 210 being secured to the stationary support surface 212. The first and the second torque control springs 206 and 210 are each sized to biasingly engage the torque arm 200 biasing the torque arm 200 in general directions 214 and 216, respectively, and to cooperatingly position the torque arm 200 in a generally horizontally extending position, as shown more clearly in FIG. 3. Thus, the first and the second torque control springs 206 and 210 biasingly resist movement of the torque arm 200 in the general directions 214 and 216, the direction 214 substantially corresponding to the closing direction of rotation 54 and the direction 216 substantially corresponding to the opening direction of rotation 52, for reasons to be made more apparent below.

A first torque switch 218 is secured to the support surface 208 and has an actuating end portion 220 disposed a predetermined distance 224 generally below the torque arm 200 (the first torque switch 218 being diagrammatically shown in FIG. 3). More particularly, the actuating end 220 of the first torque switch 218 is disposed beneath the torque arm 200 and engageable via a portion of the torque arm 200 actuating the first torque switch 218 connecting a signal to the motor control 48 via the signal path 92. A second torque switch 226 is secured to the support surface 212 and has an actuating end portion 228 disposed a predetermined distance 230 generally above the torque arm 200 (the second torque switch 226 being diagrammatically shown in FIG. 3). The actuating end 228 is disposed above the torque arm 200 and engageable via a portion of the torque arm 200 actuating the second torque switch 226 connecting a signal to the motor control 48 via the signal path 92. Torque switches capable of connecting signals to a motor control upon engagement via a particular actuating mechanism such as the torque arm 200 are well-known in the art, commercially available and further detailed description of the construction and operation of the torque switches 218 and 226 is not deemed necessary.

During one aspect of the operation of the apparatus 10 and particularly the door member drive and control assembly 12, the driver shaft 50 is driven in the closing direction of rotation 54 via the driver 44 thereby driving the driven shaft 58 in the closing direction of rotation 54 via the ball drive assembly 52. Since the housing 86 is bearingly connected to the driver shaft 50 and the driven shaft 58 via the bearing members 106 and 134, respectively, and due to the internal friction of the ball drive assembly 56, there is a tendency for the housing 86 to be rotated during the rotation of the driver shaft 50 and the driven shaft 58. The torque control springs 206 and 210 biasingly resist the rotational movement of the housing 86 and the distances 224 and 230 between the torque arm 200 and the first and the second torque switches 218 and 226 are spaced to cooperate with the first and the second torque control springs 206 and 208 such that during the operation of the door member drive and control assembly 12, when the driver shaft 50 and the driven shaft 58 are each rotated in the closing direction of rotation 54, the torque arm 200 will not move a sufficient distance in the direction 214 to actuatingly engage the first torque switch 218 or in the direction 216 to actuatingly engage the second torque switch 226. However, the second torque switch 226 is positioned such that, when the door member 14 engages an obstruction such as an individual's hand or an automobile or other such obstruction, the additional torque placed on the driven shaft 58 via the engagement between the door member 14 and the obstruction causes the housing 86 to be rotated in the opening direction of rotation 52 through the distance 230 causing the torque arm 200 to actuatingly engage the second torque switch 226 connecting the signal to the motor control 48 via the signal path 92 and positioning the motor control 48 in the off position thereby stopping the driver 44.

By the same token, the torque control springs 206 and 210 biasingly resist the rotational movement of the housing 86 and the distances 224 and 230 between the torque arm 200 and the first and the second torque control springs 206 and 210 such that during the operation of the door member drive and control assembly 12, when the driver shaft 50 and the driven shaft 58 are each rotated in the opening direction of rotation 52, the torque arm 200 will not move a sufficient distance to actuatingly engage either the first or the second torque switches 218 and 226. When the door member 14 engages an obstruction, the additional torque placed on the driven shaft 58 via the engagement between the door member 14 and the obstruction causes the housing 86 to be rotated in the closing direction of rotation 54 through the distance 224 causing the torque arm 200 to actuatingly engage the first torque switch 218 connecting a signal to the motor control 48 via the signal path 92 and positioning the motor control 48 in the off position thereby stopping the driver 44.

It should again be noted that, in one other preferred embodiment, the torque switches 218 and 226 can each be connected to the motor control 48 such that the direction of rotation of the driver shaft 50 and the driven shaft 58 is reversed upon a sensed engagement between the door member 14 and some obstruction which may be desired in some applications. In this application, the motor control 48 would position the driver 44 to rotate the driver shaft 50 in the opening direction of rotation 52 in response to a signal received from the second torque switch 226 via the signal path 92 and the motor control 48 would position the driver 44 to rotate the driver shaft 50 in the closing direction of rotation 54 in response to a signal received from the first torque switch 218 via the signal path 92.

Thus, the engagement between the door member 14 and some obstruction causes an additional torque to be applied to the driver shaft 50 and the driven shaft 58 increasing the torque applied to the torque arm 200 via the housing 86 moving the torque arm 200 in a general direction 214 or 216 into engagement with the first or the second torque switch 218 or 226 depending upon the direction of rotation of the driver shaft 50 and the driven shaft 58. As described before, when the additional load is placed on the driven shaft 58 via the engagement between the door member 14 and some obstruction, the housing 86 is rotated in a direction generally opposed to the direction of rotation of the driver shaft 50 and the driven shaft 58. The spring characteristics of the torque control springs 206 and 210, such as the spring tension, for example, and the distances 224 and 230 essentially control the amount of torque which must be applied to the torque arm 200 to move the torque arm 200 into actuating engagement with one of the first or the second torque switches 218 or 226. Thus, the amount of force which must be applied between the obstruction and the door member 14 to cause the torque arm 200 to be moved into actuating engagement with one of the first or the second torque switches 218 or 226 is adjustably controllable via positioning and repositioning the torque switches 218 and 226 thereby altering the distances 224 and 230 between the first and the second torque switches 218 and 226 and the torque arm 200.

In one operational embodiment of the door member drive and control assembly 12, it has been found that the ball drive assembly 56 and, more particularly, the torque control 90 portion of the ball drive assembly 56 will sense the engagement between the door member 14 and a single finger of an individual, for example, the engagement between the door member 14 and the individual's finger (the obstruction) causing a sufficient additional torque to be applied to the driver shaft 50 and the driven shaft 58 moving the torque arm 200 into actuating engagement with one of the torque switches 218 or 226.

Utilizing the ball drive assembly 56, the door member 14 can also be stopped at an intermediate position generally between a raised or opened position, and a lowered or closed position of the door member 14 which may be desired in some applications. It has been found that it requires a substantially increased amount of force applied to the door member 14 to move the door member 14 from the intermediate position in the opening or the closing directions 18 or 20. More particularly, the ball drive assembly 56 has been found to have a substantially increased internal friction as compared to the usual coupling devices such as pulley-belt drives or the like, thereby increasing the amount of force which must be applied to the door member 14 to move the door member 14 from a stopped or parked position.

It should be particularly emphasized that the ball drive assembly 56 has a substantially lower torque on the housing 86 during normal operation as compared with the torque encountered utilizing an ordinary concentric transmission, the torque on the housing 86 being approximately zero or negligible until the torque applied to the driver shaft 50 reaches one of the predetermined actuating limits causing the rotation of the housing 86 and the movement of the torque arm 200 into engagement with one of the torque switches 218 or 226. The torque on the housing 86 at either of the predetermined actuating limits is substantially less than the torque at the same actuating limits encountered via an ordinary concentric transmission. Thus, utilizing the ball drive assembly 56 of the present invention, substantially weaker springs can be utilized for the torque control springs 206 and 210 as compared to the springs which would have to be utilized in the same application with an ordinary concentric drive, the ball drive assembly 56 thereby providing a more sensitive torque control.

In the ordinary concentric drives a momentary disturbance caused by vibration, for example, may cause a sufficient increase in the torque applied to the drive shaft and thus result in the torque control being prematurely actuated. The ball drive assembly 56 of the present invention also provides a preloaded drive having an internal friction which operates to dampen momentary torque loads applied to the housing 56 via vibration or the like thereby substantially preventing the actuation of the torque switches 218 and 226 as a result of momentary disturbances, or, in other words, substantially preventing the actuation of the torque switches 218 and 226 prior to the predetermined actuating torques being applied to the driven shaft.

Further, the ball drive assembly 56 has been found to have a relatively low moment of inertia, and thus the ball drive assembly 56 cooperates to stop the movement of the door member 14 upon activation of the first or the second torque switches 218 or 226, respectively, or upon the activation of the limit switches 78 and 80. This feature of the ball drive assembly 14 is particularly important with respect to the operation of the torque switches 218 and 226 since the ball drive assembly 56 cooperates to bring the door member 14 travel to a stop in a substantially reduced period of time which is particularly desirable when the sensed obstruction is a hand or other portion of a human being. The apparatus 10 thus provides a substantially safer operating apparatus for opening and closing door members 14.

The losses ($E'$) of the ball drive assembly 56 per revolution of the driven member 168 divided by the output torque of the ball drive assembly 56 are substantially constant and virtually independent of the output load. The input torque ($M$) of the ball drive assembly 56 is determined in accordance with the following expression:

$$M = (1/i)(1 + E'M_4) \qquad 5$$

wherein:
$M_4$ = the maximum load on the ball drive assembly 56 prior to slippage between the balls 184 and the driven member 168; and
l = the loading torque on the ball drive assembly 56.

The input torque ($M$) of the ball drive assembly 56 follows essentially a straight line when plotted as a function of the loading torque (l) and, at full load, the loading torque (l) is essentially the same. At full load, the loading torque (l) is the same as the maximum load ($M_4$) and the input torque ($M$) is the same as the torque ($M_o$), the expression (5) thus being as follows at full load conditions of the ball drive assembly 56.

$$M_o = \frac{1}{i}(M_4 + E'M_4) = \frac{M_4}{i}(1+E') \qquad (6)$$

The efficiency ($\eta$) of the ball drive assembly 56 is expressed as follows:

$$\eta = 1/(E'+1) \qquad 7$$

By substituting the losses ($E'$) as defined via expression (7) above for the losses ($E'$) term in expression (6) above, the torque ($M_o$) is expressed as follows:

$$M_o = \left(\frac{M_4}{i}\right)\left(\frac{1}{\eta}\right) \qquad (8)$$

The torque ($M_o$) on the driving member 144 can also be expressed in terms of the torque ($M_0$) and the ratio ($n$) between the output torque and the input torque $$M_4 = (M_o)(n) \qquad 9$$

From expression (9) above, the ratio ($n$) between the output torque and the input torque can be expressed in terms of the ratio ($i$) of the number of revolutions of the driving member 144 per revolution of the driven member 168 and the efficiency ($\eta$) of the ball drive assembly 56.

$$n = (i)(\eta)$$

By substituting the efficiency ($\eta$) as defined via the expression (10) above for the efficiency ($\eta$) term in expression (9) above, the torque ($M_o$) is expressed as follows:

$$M_n = M_s/n \qquad 11$$

From expression (5) above, it is observed that the ball drive assembly 56 exerts a relatively constant load on the driver 44. Thus, in those applications where the driver 44 is load sensitive, the output speed of the driven shaft 50 will be essentially constant and will be substantially unaffected by the loading torque (l). Also, the ball drive assembly 56 will operate in a manner less dependent upon the loading torque (l) as the losses ($E'$) are increased. Of course, the ball drive assembly 56 is designed in a manner tending to reduce the losses ($E'$) and achieve higher efficiency, however the larger the ratio ($i$), the lower the efficiency since the ball drive assembly 56 maintains a relatively constant speed.

Since the losses ($E'$) are substantially constant, the ball drive assembly 56 will become a constant torque brake type of device when the driver 44 is switched to the off condition. The ball drive assembly 56 will thus cooperate as a component of the door member drive and control assembly 12 to stop the rotation of the driven shaft 58 essentially immediately upon switching the driver 44 to the off condition.

Thus, the ball drive assembly 56 has been found particularly useful as the essential element of the torque control 90, the ball drive assembly 56 cooperating to provide a torque control which is particularly reliable and sensitive to relatively small changes in the torque applied at the output driven shaft 58. Further, utilizing the ball drive assembly 56, the torque control 90 functions directly in cooperation with the speed reducing mechanism interposed between the driver shaft 50 and the driven shaft 58 thereby providing a more efficient, more reliable torque sensing assembly which is particularly desirable in automatic door opener applications, such as garage doors and elevator doors and the like, such torque control operating to provide a substantially safer operation.

Embodiment of FIG. 5

Shown in FIG. 5 is a modified apparatus 10c for opening and closing the door member 14, the modified apparatus 10c being constructed similar to the apparatus 10, shown in FIGS. 1 through 4 and described in detail before. The modified apparatus 10c includes the driver 44 connected to the ball drive assembly 56 for drivingly rotating the driver shaft 50 and a modified driven shaft 58c, the driver 44, the driver shaft 50 and the ball drive assembly 56 being constructed and connected in a manner exactly like that described before with respect to the door member drive and control assembly 12 shown in FIGS. 1 through 4. The driven shaft 58c is connected to the ball drive assembly 56 in a manner exactly like that described before with respect to the driven shaft 58c; however, the end of the driven shaft 58c, opposite the end thereof connected to the ball drive assembly 56, is drivingly coupled to a door shaft 300 via a coupling 302.

The door shaft 300 is journally supported in a generally horizontally extending position via a pair of spaced journal supports 304 and 306, each of the journal supports 304 and 306 being secured to a support surface 308 and a portion of the door shaft 300 extending through and being journally supported via each of the journal supports 304 and 306. In one operational embodiment, the door shaft 300 includes a first door shaft 307 and a second door shaft 309, one end of each of the door shafts 307 and 309 being journally supported via a member 311 and one end of the first door shaft 307 being coupled to one end of the second door shaft 309 (the coupling between the door shafts 307 and 309 not being shown in FIG. 5). This last-mentioned embodiment is particularly useful when the door shaft 300 extends across a substantially large distance between the journal supports 304 and 306.

A first pulley drum 310 is secured to the door shaft 300 and a second pulley drum 312 is secured to another portion of the door shaft 300, the pulley drums 310 and 312 each being disposed generally between the journal supports 304 and 306 and the first pulley drum 310 being spaced a predetermined distance along the door shaft 300 from the second pulley drum 312. The pulley drums 310 and 312 are similarly constructed and each of the pulley drums 310 and 312 include a cylindrically shaped base portion 314 and a pair of retaining flanges 316, one of the retaining flanges 316 being secured to each end of the base 314.

One end of a cable 318 is secured to the base 314 of the first pulley drum 310 and the opposite end of the cable 318 is secured to a lower end portion of the door member 14 via a connecting flange 320 or other such similar type of connection. One end of a cable 322 is secured to the base 314 portion of the second pulley drum 312 and the opposite end of the cable 322 is secured to a lower end portion of the door member 14 via a connecting flange 324 or other such similar type of connection. A first spring 326 is disposed about a portion of the first door shaft 307 and extends generally between the first pulley drum 310 and the member 311, one end of the first spring 326 being secured to the first door shaft 307 and the opposite end of the first spring 326 being secured to the member 311. A second spring 327 is disposed about a portion of the second door shaft 309 and extends generally between the second pulley drum 312 and the member 311, one end of the second spring 327 being secured to the second door shaft 309 and the opposite end of the second spring 327 being secured to the member 311. An apparatus for opening and closing garage doors having door shafts, pulley drums, cables connected between pulley drum and the door member, and springs connected about the door shafts is commercially available.

The driver 44 and the ball drive assembly 56 function to raise the door member 14 in an opening direction 18c and to lower the door member 14 in a closing direction 20c in a manner like that described before with respect to the apparatus 10. The ball drive assembly 56 permits a direction connection between the driver shaft 50 and the driven shaft 58c thereby eliminating numerous parts and assembly generally required to effect the speed reduction required for such automatic door opener applications and providing a safer, more economical and more efficient construction and operation. Although not specifically shown in FIG. 5, the apparatus 10c is, in a preferred form, also equipped with the torque control 90, described before.

It should be particularly noted that the ball drive assembly 56 provides the bearing support for one end of the shaft 58c and, in a preferred embodiment, the journal support 304 can be eliminated and the shaft 58c can be formed integrally with the first door shaft 307 thereby eliminating the need for the coupling 302. In this preferred embodiment, the shaft 58c forms the first door shaft 307 and the utilization of the ball drive assembly 56 eliminates the need for the journal support 304 and the coupling 302.

Embodiment of FIG. 6

Shown in FIG. 6 is another modified apparatus 10d for opening and closing a door member 14d having an upper side 400, a lower side 402 and opposite ends 404 and 406. The driver shaft 58d is connected to the ball drive assembly 56 and the end of the driver shaft 58d is connected to the lower side 402 of the door member 14d generally near the end 406. A driver shaft extension 408 is secured to the upper side 400 of the door member 14d generally near the end 406. The driver shaft extension 408 is axially aligned with the driver shaft 58d and the driver shaft extension 408 is journally connected via a journal member 410, the driver shaft 58d being journally connected to a journal member 412.

In one form, the driver shaft 58d extends through the door member 14d and the driver shaft extension 408 is, more particularly, an extension and an integral part of the driver shaft 58d. In a preferred form, the driver shaft extension 408 is a separate shaft member, the particular construction details depending upon the various design considerations of a particular application. In those applications where the driver shaft 58d is a separate shaft member connected directly to the lower side 402 of the door member 14d, the journal member 412 can be eliminated, the journal member 412 being shown in FIG. 6 merely for the purpose of completeness.

In any event, the driver shaft 58d connects the door member 14d to the driver 44, the driver 44 rotating the driver shaft 58d via the ball drive assembly 56 in one direction moving the door member 14d in an opening direction 414 removing the door member 14d from the door opening 418 and providing access to the door opening 418 (diagrammatically shown in FIG. 6), and the driver 44 rotating the driver shaft 58d in an opposite direction moving the door member 14d in a closing direction 416 to a closed position wherein the door member 14d substantially encloses the door opening 418. The driver 44 and the ball drive assembly 56 thus function to open and close the door member 14d in a manner like that described before with respect to the apparatus 10 and 10c. In a preferred form, the apparatus 10d includes the torque control 90 (not shown in FIG. 6) constructed and operating in a manner like that described before with the apparatus 10 and 10c. It should be particularly noted that, in the vertical mounting arrangement utilizing the present invention as shown in FIG. 6, the bearing member 134 (shown in FIG. 2) can be eliminated since the journal member 410 provides the necessary bearing support. Further, the spring 178 (shown in FIG. 2) can be eliminated in those applications where the weight of the door member 14d provides the necessary biasing force.

Embodiment of FIG. 7

Shown in FIG. 7 is yet another modified apparatus 10f for opening and closing a door member 14f having an upper side 500, a lower side 502 and opposite ends 504 and 506. The door member 14f is rollingly supported in a door opening 508 (diagrammatically shown in FIG. 7) via rollers 510 (the rollers 510 being designated via a reference numeral in FIG. 7) for movement in a closing direction 512 to a closed position substantially enclosing the door opening 508 and for movement in an opening direction 514 and removing the door member 14f or a portion of the door member 14f from the door opening 508.

The driver shaft 58f includes a threaded driver shaft extension 516 which, in one preferred form, is integrally constructed with the driver shaft 58f. The driver shaft 58f including the driver shaft extension 516 is journally supported via the ball drive assembly 56 and a journal support 520.

A connector 522 having a threaded opening 524 extending therethrough is threadedly connected to the driver shaft 58f, the driver shaft 58f threadedly extending through the threaded opening 524. The connector 522 is secured to the lower side 502 of the door member 14f.

Thus, as the driver shaft extension 516 is rotated in one direction via the driver 44, the connector 522 is moved in one axial direction moving the door member 14f in the opening direction 514 via the threaded connection between the connector 522 and the driver shaft extension 516 and the connection between the connector 522 and the door member 14f. By the same token, when the driver shaft extension 516 is rotated in the opposite direction via the driver 44, the connector 522 is moved in the opposite axial direction thereby moving the door member 14f in the closing direction 512.

The driver 44 is thus connected to the door member 14f via the ball drive assembly 56 to open and close the door member 14f in a manner like that described before with regard to the apparatus 10, 10c, 10d. Further, the apparatus 10f, in a preferred form, includes the torque control 90 (not shown in FIG. 7) constructed and operating in a manner like that described before with respect to the apparatus 10, 10c and 10d.

It should be specifically noted that the door member drive and control assembly of the present invention is also connectable to a pair of door members such that, in one rotating direction of the driver shaft, the two door members are moved in opposite opening directions to an opened position removing the two door members from the door member opening. By the same token, when the driver shaft is rotated in the opposite direction, the two door members are moved in a closing direction generally toward each other, each door member substantially encompassing and enclosing one-half of the door opening in the closed position. The particular construction and operation of door members operating in a manner best described above are well known in the art and the connection between the door members and the driver shaft and the door members for moving the door members in opening and closing directions will be apparent to those skilled in the art in view of the detailed description of the apparatus 10, 10c, 10d and 10f herein.

Embodiment of FIG. 8

In some applications, the door members are opened and closed via a cable such as typically found in some elevator door applications, for example. Shown in FIG. 8 is a modified ball drive assembly 56g connected between the driver shaft 50g and the driven shaft 58g which is particularly suitable for those applications wherein the door member (not shown in FIG. 8) is operated via a cable connected to a drum 600, the cable (not shown in FIG. 8) is retrieved about the drum 600 when the driven shaft 58g is rotated in one direction and the cable is released from the drum 600 when the driven shaft 58g is rotated in the opposite direction. The drum 600 thus functions in a manner similar to the pulley drums 310, and 312, shown in FIG. 5 and described before, the drum 600 being directly connected to the driven shaft 58g extending from the ball drive assembly 56g.

The driver shaft 50g is connected to the driver 44 (not shown in FIG. 8) and is constructed exactly like the driver shaft 50 described before with respect to FIGS. 1 and 2, except a reduced diameter portion 602 is formed on the end of the driver shaft 50g, which is connected to a portion of the ball drive assembly 56g, forming an annular stop surface 604 extending about the driver shaft 50g and a key slot 606 is formed in the reduced diameter portion 600 extending a distance axially along the driver shaft 50g. A modified driving member 144g is connected to the reduced diameter portion 602 of the driver shaft 50g.

The driving member 144g is constructed exactly like the driving member 144, shown in FIGS. 1, 2 and 4, and described before, except a key element 608 is formed on a portion of the inner peripheral surface formed via the bore 152g extending a distance radially inwardly and axially along the driving member 144g. In an assembled position, the reduced diameter portion 602 of the driver shaft 50g is inserted through the bore 152g to a position wherein the end 146g abuts the stop surface 606 limiting the axial movement of the driving member 144g in one direction and positioning the driving member 144g in an assembled position on the driver shaft 50g, the key element 608 being disposed in the key slot 606 thereby keying the driving member 114g to the driver shaft 50g. In this position, the driving member 144g is secured to the driver shaft 50g.

The housing 86g is constructed similar to the housing 86 (shown in FIGS. 1, 2, 3 and 4, and described before, except the body 108g does not include a counterbore, similar to the counterbore 122 in the body 108g and the projection 126g is extended a greater distance from the end 112g of the body 108g thereby enlarging the space formed via the bore 130g for providing a spring space 610 in the body 108g. The projection 126g, more particularly, extends a distance into a bore 612 formed through one end 614 of the drum 600 and extending a distance axially therethrough terminating with an end wall 616, the drum 600 encompassingly housing a substantial portion of the projection 126g, for reasons to be made more apparent below.

A counterbore 618 is formed in the shaft opening 132 intersecting the end wall 616 and extending a distance axially along the shaft opening 132. The bearing member 134g is secured in the opening formed via the counterbore 618 and bearingly engages a portion of the driver shaft 58g extending therethrough.

The driven shaft 58g has a reduced diameter portion 620 formed on one end portion thereof and another reduced diameter portion 622 formed on the opposite end thereof. The reduced diameter portion 622 extends through an opening 624 formed axially through the drum 600 intersecting the end wall 616 and the end 626 of the drum. The reduced diameter portion 620 of the driven shaft 58g is securedly affixed to the adjacent portion of the drum 600 for rotating the drum 600 during the operation of the ball drive assembly 56g.

The reduced diameter portion 622 of the driven shaft 58g extends a distance through the shaft opening 174g of the driven member 168g to a position wherein the end of a projection 626 abuts the annular wall formed about the driven shaft 58g via the reduced diameter portion 622 thereby positioning the driven member 168g in an assembled position on the driven shaft 58g. In this position, the driven shaft 58g is securedly affixed to the driven member 168g.

The driven member 168g is constructed similar to the driven member 168, shown in FIGS. 1, 2 and 3, and described before, except the driven member 168g includes a base 628 and a ring 630. A recess 632 is formed in the outer periphery of the base 628 and the ring 630 is disposed in the recess 632, the ring 630 being securedly affixed to the base 628 to form the driven member 168g. The bearing surface 176 is formed on the ring 630. Thus, the base 628 and the ring 630 provide a two-piece construction and allow the bearing surface 176 to be machined on the ring 630 which may be more economical in some applications.

A spring flange 634, having opposite end faces 636 and 638 and an opening 640 formed through a central portion thereof, is slidingly disposed on the driven shaft 58g, the driven shaft 58g extending through the opening 640. A recess 642 is formed in the end face 636 extending a distance axially generally toward the end face 638. One end of a spring 644 is disposed in the recess 642 engaging the annular wall formed in the spring flange 634 via the recess 642 and the opposite end of the spring 644 engages the end face 172 of the driven member 168g. The driven shaft 58g extends through a central portion of the spring 644 or, more particularly, the spring 644 is disposed about the driven shaft 58g.

The spring 644 biasingly engages the driven member 168g and biases the spring flange 634 to a position wherein the end face 638 engages the bearing member 134g. The spring 644 thus biases the driven member 168g toward the balls 184 and functions to maintain a predetermined normal force on the balls 184 during the operation of the ball drive assembly 56g in a manner similar to that described before with respect to the spring 178 shown in FIG. 2.

The end plate 94g is disposed in the body 108g bore 116g to a position wherein the end face 98g thereof abuts the end of the fixed member 136. The end plate 94g is retained in this position via a retaining ring 646 which is secured in an annular recess 648 formed in a portion of the annular wall formed in the body 108g via the bore 116g. A seal member 650 is disposed in the shaft opening 102g sealingly engaging an adjacent portion of the driver shaft 50g and an adjacent portion of the end plate 44g.

The ball drive assembly 56g will operate in a manner substantially like that described before with respect to the other ball drive assemblies and, in addition, provides a construction wherein the drum 600 can be directly connected to the driven shaft 58g and the housing 56g projection 126g is enlarged to provide additional space for accommodating a longer spring 644 which will have a lower rate. Further, since the projection 126g is disposed in the drum 600 bore 612 the overall length of the ball drive assembly 56g and the drum 600 is not substantially increased, thereby providing a more compact assembly. The ball drive assembly 56g will be less sensitive to stacked tolerances in a particular application and less costly in construction, the two-piece driven member 168g also providing a more economical construction.

Figures 9, 10:
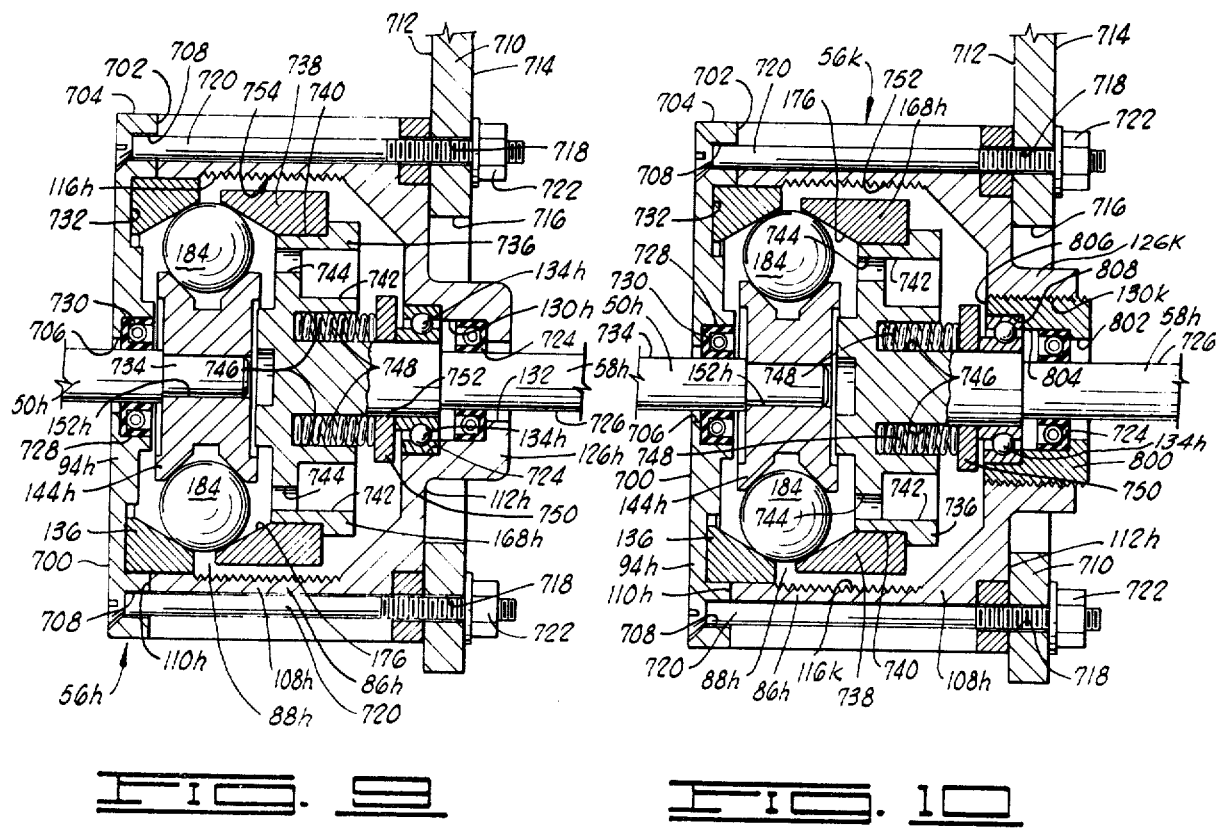
FIG. 9 is a sectional view, similar to FIG. 8, but showing another modified ball drive assembly.
FIG. 10 is a sectional view, similar to FIGS. 8 and 9, but showing still another modified ball drive assembly.

Embodiment of FIG. 9

Shown in FIG. 9 is another modified ball drive assembly 56h which is constructed similar to the ball drive assembly 56, shown in FIGS. 1, 2, 3 and 4 and described before, and similar to the ball drive assembly 56g, shown in FIG. 8 and described before, the salient differences being described below.

The housing 86h body 108h does not include a flange formed on the end 110h similar to the flange 118 formed on the body 108 (FIGS. 1–4), and a counterbore is not formed in the end 110h similar to the counterbore 120 (FIGS. 1–4). In the embodiment of FIG. 9, a modified end plate 94h, having opposite end faces 700 and 702, an outer periphery 704 and a shaft opening 706 formed through a central portion thereof, is connected to the end 110h of the body 108h, the end face 702 abutting the end 110h. A portion of the end plate 94h extends radially beyond and circumferentially about the outer peripheral surface of the body 108h. A plurality of circumferentially spaced bolt holes 708 are formed through the radially extending portion of the body 108h.

A second end plate 710, having opposite end faces 712 and 714 and an opening 716 formed through a central portion thereof, is connected to the end 112h of the body 108h, the end face 712 abutting the end 112h of the body 108h in an assembled position. A portion of the second end plate 710 extends radially beyond the outer peripheral surface of the body 110h and a plurality of circumferentially spaced bolt holes 718 are formed through the radially extending portion of the second end plate 710. A plurality of bolts 720 are extended through the bolt holes 708 and 720 and each bolt 720 is secured in an assembled position via a nut 722, the bolts 718 securing the end plates 94h and 710 to the opposite ends 110h and 112h of the body 108h.

The bearing member 134h is disposed in a counterbore 724 formed in the projection 126h bore 130h and a seal member 724 is disposed in the bore 130h. The driven shaft 58h has a reduced diameter portion 726 and extends through the shaft opening 132. The seal member 724 sealingly engages adjacent portions of the driven shaft 58h and adjacent portions of the body 108h, and the bearing member 134h bearingly engages the driven shaft 58h.

A counterbore 728 is formed in the end face 702 of the end plate 94h generally adjacent and intersecting the shaft opening 706. A seal member 730 is disposed in the counterbore 728, and sealingly engages adjacent portions of the end plate 94h and the driver shaft 50h. The seal member 730 cooperates with the seal member 724 to substantially sealingly enclose the hollow portion 88h of the housing 86h body 108h to substantially prevent the leakage of fluid from the hollow portion 88h along either the driver shaft 50h or the driven shaft 58h, for reasons to be made more apparent below.

The fixed member 136 is disposed in an annular recess 732 formed in the end face 702 of the end plate 94h and a modified driving member 144h is secured to a reduced diameter portion 734 of the driver shaft 50h. More particularly, the reduced diameter portion 734 extends through the bore 152h formed through a central portion of the driving member 144h.

A modified driven member 168h is secured to the driven shaft 58h. The driven member 168h includes a base 736 and a ring 738. A recess 740 is formed in the outer periphery of the base 736 and the ring 738 is disposed in the recess 740, the ring 738 being securedly affixed to the base 736 to form the driven member 168h. The bearing surface 176 is formed on the ring 738. Thus, the base 736 and the ring 738 provide a two-piece construction for reasons and in a manner similar to that described before with respect to the driven member 168g (FIG. 8).

A plurality of circumferentially spaced openings 742 are formed through the base 736 of the driven member 168h, each opening 742 intersecting the end faces 700 and 702. Each opening 742 has a reduced diameter portion 744. The openings 742 are sized and spaced to allow the flow of a lubricating fluid therethrough during the operation of the ball drive assembly 56h.

A plurality of circumferentially spaced holes 746 are formed in one end face of the base 736 and a spring 748 is disposed in each of the holes 746. Each spring 748 extends beyond the end face of the base 736 and engages a spring plate 750. The spring plate 740 has an opening 752 formed through a central portion thereof and the driven shaft 58h extends through the opening 752. The spring plate 752 engages a portion of the bearing member 134h and each of the springs 748 engages the spring plate 750 and the driven member 168h biasing the driven member 168h; the springs 748 functioning to maintain a predetermined normal force on the balls 184 in a manner and for reasons similar to that described before with respect to the spring 178 (FIG. 2) and the spring 644 (FIG. 8). In general, the number of springs 748 utilized in a particular operational embodiment determines, in part, the maximum load prior to slippage and thus cooperates to determine the horsepower rating of the ball drive assembly.

The annular wall formed in the body 108h by the bore 116h is threaded as indicated via the reference 754 in FIG. 9. The openings 752 in the base 736 of the driven member 168h provide a fluid path to facilitate the circulation of a lubricating fluid disposed in the hollow portion 88h and the flow or, more particularly, the circulation of the lubricating fluid is achieved by the balls 184, which act in the nature of vanes of a centrifugal pump, and the threaded portion 754 in the body 108h cooperates to guide the lubricating fluid in a direction generally toward the driven shaft 58h during the operation of the ball drive assembly 56h.

The ball drive assembly 56h will operate in a manner similar to that described before with respect to the other various embodiments, however, the ball drive assembly 56 is particularly useful in larger horsepower applications.

Embodiment of FIG. 10

The ball drive assembly 56k is constructed exactly like the ball drive assembly 56h, shown in FIG. 9 and described before, except the ball drive assembly 56k includes an adjusting nut 800 threadedly disposed through an enlarged bore 130k which is threaded and extends through the projection 126k. A shaft opening 802 extends axially through the adjusting nut 800 and a counterbore 804 is formed through an end 806 of the adjusting nut 800, the counterbore 804 extending a distance axially through the adjusting nut 800. A second counterbore 808 is formed on the end 806 and extends a distance axially through the adjusting nut 800, the second counterbore having a larger diameter as compared to the diameter of the counterbore 804, as shown in FIG. 10. The bearing member 134h is disposed in the counterbore 808 and the seal member 724 is disposed in the counterbore 804.

As the adjusting nut 800 is rotated in one direction, the adjusting nut 800 is moved inwardly toward the driven member 168*h* thereby driving the bearing member 134*h* and the spring plate 750 inwardly compressing the springs 748 between the spring plate 750 and the driven member 168*h*. The compression of the springs 748 is reduced as the adjusting nut 800 is rotated in the opposite direction. The ball drive assembly 56*k* will operate in a manner like that described before with respect to the ball drive assembly 56*h* (FIG. 9) and, in addition, provides a means for adjusting the compression of the springs 748, thereby providing a means for adjusting the maximum load prior to slippage via the externally accessible adjusting nut 800.

It should be particularly noted that the various embodiments of the ball drive assembly disclosed herein can be utilized in various applications and the invention has been particularly shown as an integral portion of a door member opening and closing type of apparatus for the purpose of illustrating this one preferred operational embodiment. Other applications of the ball drive assembly will be apparent to those skilled in the art in view of the detailed description contained herein with respect to the door member opening and closing application.

Further, the ball drive assemblies disclosed herein each utilized a spring biasing member disposed generally between the ball drive assembly housing or, more particularly, the bearing member and the driven member. This particular construction has been found to provide a relatively compact and relatively uncomplicated construction particularly since this type of construction virtually eliminates the requirement of fixing the driven member against rotation during the operation of the ball drive assembly. Additionally, this particular spring location has been found to permit a construction reducing the spacing between the fixed member and the driven member thereby providing additional space within the ball drive assembly housing for the spring.

Changes may be made in the construction and the operation of the various parts, elements and assemblies of the embodiments described herein without departing from the spirit and the scope of the inventions as defined in the following claims.

What is claimed is:

1. Torque responsive apparatus, sensing the torque applied to a driven shaft, comprising:
    a driver shaft, having opposite ends;
    a driver connected to one end of the driver shaft drivingly rotating the driver shaft in a first direction of rotation;
    a housing having a hollow portion formed in a portion thereof, the end of the driver shaft, opposite the end connected to the driver, extending through a portion of the housing and being disposed in the hollow portion of the housing;
    means journally connecting the housing and the driver shaft;
    a driven shaft, having opposite ends, one end of the driven shaft extending through a portion of the housing and being disposed in hollow portion of the housing;
    means journally connecting the housing and the driven shaft;
    means disposed in the hollow portion of the housing having a portion forming an annular ball race, a portion being connected to the housing, another portion connected to the driver shaft and yet another portion connected to the driven shaft;
    at least one ball rollingly disposed in the ball race and the portion of the means forming the ball race connected to the housing contacting each ball, the portion of the means forming the ball race connected to the driver shaft contacting each ball and the portion of the means forming the ball race connected to the driven shaft contacting each ball, the rotation of the driver shaft drivingly rotating the driven shaft via each ball and the portions contacting each ball; and
    a torque control having a portion connected to the housing sensing the rotational movement of the housing, the rotational movement of the housing indicating the torque applied at the driven shaft.

2. The apparatus of claim 1 wherein the torque control is defined further to include:
    a torque arm, having opposite ends, one end secured to the housing and the torque arm extending a distance from the housing;
    means having a portion engaging the torque arm and biasingly holding the torque arm and the housing connected thereto with a predetermined bias force; and
    means sensing the movement of the torque arm against the biasing force indicating the torque applied at the driven shaft.

3. The apparatus of claim 2 wherein the driver rotates the driver shaft in the first direction of rotation and a second direction of rotation, generally opposite the first direction of rotation and wherein the means biasingly engaging the torque arm includes:
    first torque spring means having a portion engaging the torque arm and biasing the torque arm in one direction, generally opposed to the first direction of rotation, with a predetermined bias force; and
    second torque spring means having a portion engaging the torque arm and biasing the torque arm in a direction, generally opposed to the biasing direction of the first torque spring means, with a predetermined bias force, the movement of the torque arm indicating a torque applied at the driven shaft causing a torque applied at the torque arm via the housing sufficient to move the torque arm against the biasing force of the first and the second torque springs.

4. The apparatus of claim 3 wherein the means sensing the movement of the torque arm includes:
    a first torque switch disposed a predetermined distance from the torque arm and engageable with the torque arm when moved the predetermined distance against the biasing force of the first torque spring means, the first torque switch means providing an output signal in an engaged position of the first torque switch means and the torque arm, and
    second torque switch disposed a predetermined distance from the torque arm and engageable with the torque arm when moved the predetermined distance against the biasing force of the second torque spring means, the second torque switch means providing an output signal in an engaged position of the second torque switch means and the torque arm.

5. The apparatus of claim 4 wherein the driver is defined further as a motor and wherein the apparatus is defined further to include:

an electrical power source; and a motor control connected to the electrical power source, the first torque switch means, the second torque switch means and the motor, the motor control connecting the electrical power source to the motor for rotatingly driving the driver shaft in the first direction of rotation in one position thereof and connecting the electrical power source to the motor for rotatingly driving the driver shaft in the second direction of rotation in one other position thereof, the motor control receiving the signal from the first torque switch means and disconnecting the electrical power source from the motor in response to the received signal and receiving the signal from the second torque switch means and disconnecting the electrical power source from the motor in response to the received signal.

6. The apparatus fo claim 4 wherein the driver is defined further as a motor and wherein the apparatus is defined further to include:

an electrical power source; and a motor control connected to the electrical power source, the first torque switch means, the second torque switch means and the motor, the motor control connecting the electrical power source to the motor for rotatingly driving the driver shaft in the first direction of rotation in one position thereof and connecting the electrical power source to the motor for rotatingly driving the driver shaft in the second direction in one other position thereof, the motor control receiving the signals from the first and the second torque switch means and connecting the motor and the electrical power source for changing the direction of rotation in response to one of the first and the second switch means signals received via the motor control.

7. The apparatus of claim 1 wherein the means forming an annular ball race is defined further to include:

a fixed member, connected to housing, having an annular bearing surface formed thereon, the fixed member bearing surface contactingly engaging each ball;

a driving member connected to the driver shaft, having an annular bearing surface formed thereon, the driving member bearing surface contactingly engaging each ball; and the driving member being rotated via the driver shaft in a driven position of the driver shaft; and a driven member connected to the driven shaft, having an annular bearing surface formed thereon, the driven member bearing surface contactingly engaging each ball, and the driven member bearing surface, the driving member bearing surface and the fixed member bearing surface forming the annular bearing race, the driven member being drivingly rotated via the contacting engagement between the driven member bearing surface and each ball in a driven position of the driver shaft.

8. The apparatus of claim 7 defined further to include:

a spring biasingly engaging the driven member biasingly maintaining the contacting engagement and placing a predetermined axial, normal force between the driven member bearing surface and each ball.

9. The apparatus of claim 7 wherein the driver shaft and the driven shaft each rotate about a common axis of rotation, and wherein the fixed member bearing surface, the driving member bearing surface, and the driven member bearing surface each extend annularly about the common axis of rotation of the driver shaft and the driven shaft.

10. The apparatus of claim 7 wherein the driving member is defined further as having a pair of spaced bearing surfaces formed thereon.

* * * * *